May 6, 1947.  H. RODMAN, JR  2,419,969
PROCESS OF RECOVERING AND PURIFYING CARBAZOLE AND ANTHRACENE
Filed Sept. 4, 1943
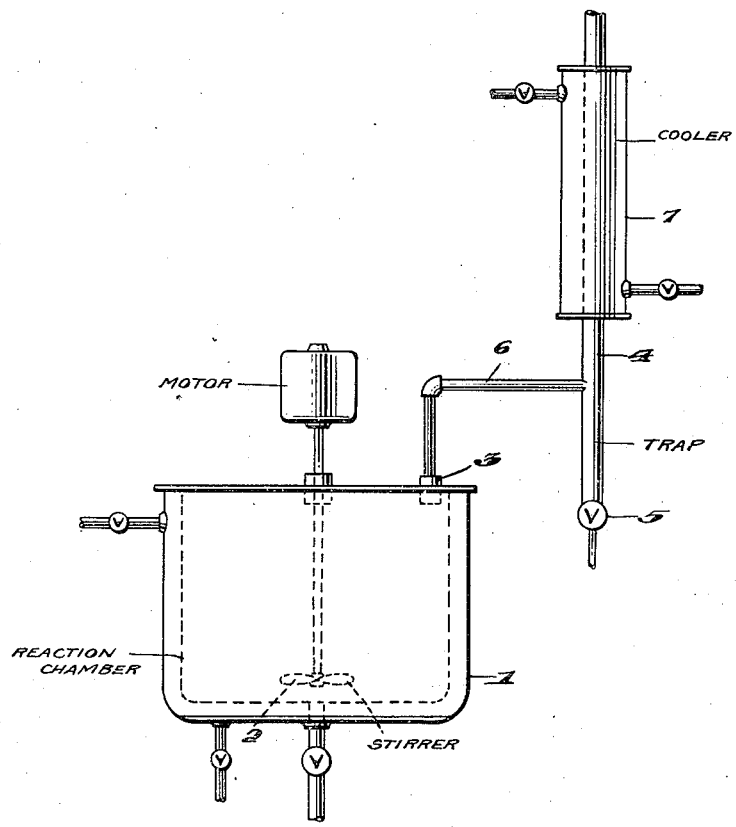
Inventor:
Hugh Rodman, Jr.
By Frank H. Wisch.
Attorney Patented May 6, 1947

2,419,969

UNITED STATES PATENT OFFICE 2,419,969

PROCESS OF RECOVERING AND PURIFYING CARBAZOLE AND ANTHRACENE

Hugh Rodman, Jr., Pittsburgh, Pa., assignor, by mesne assignments, to Koppers Company, Inc., a corporation of Delaware Application September 4, 1943, Serial No. 501,311

2 Claims. (Cl. 260—318)

This invention relates to improvements in methods of separating carbazole from anthracene and other hydrocarbons with which carbazole is ordinarily associated. The invention includes also the simultaneous production of carbazole-free anthracene.

Various methods for separating carbazole from anthracene and other coal tar compounds have been employed prior to the present invention. Such methods have been found difficult, tedious, expensive and generally unsatisfactory. Most of such prior methods require the use of large volumes of solvents and though it is possible with considerable precaution to produce anthracene-free carbazole or carbazole-free anthracene by means of such processes the yields are relatively low and excessive losses of carbazole or anthracene result particularly in residues from which they are not recoverable.

One well known and most generally accepted method of separating carbazole from compounds associated therewith comprises reacting the carbazole in such a mixture with potassium hydroxide, otherwise referred to as potash, to form potassium carbazolate. The carbazolate is insoluble in the resulting mass and also in oils or coal tar solvents, and precipitates out or remains in suspension depending upon the consistency of the reaction mass. The aforegoing reaction is generally carried on in one of two ways. In one method the crude carbazole is completely dissolved in a suitable solvent and solid caustic is added to form the insoluble carbazolate which is subsequently separated by filtration. In the second method, known as the "fusion" method, the crude carbazole or so-called cake is melted by heating it to a temperature above 235° C., and then solid caustic is added while agitating the melt. The insoluble carbazolate is subsequently separated from the reaction mass.

I have discovered that in the above previously used fusion method the completeness of the reaction between carbazole and caustic rarely exceeds 80% and never exceeds 90%. This is found to be true even though higher temperatures of reaction and large excesses of caustic above that theoretically required to combine with all of the carbazole present in the crude thereof, are employed. In either case the soluble carbazole is never completely converted into the insoluble carbazolate.

In the method of the present invention a simple and complete separation of carbazole from anthracene and other compounds ordinarily associated therewith is made possible by heating together crude carbazole and caustic at temperatures at which carbazolate is formed, while contacting the reaction mass with relatively small amounts of liquid such as a volatile solvent. It is noted that the reaction is as follows: carbazole (dibenzopyrrole) + potassium hydroxide → potassium carbazolate + water.

The liquid medium added to the reaction mass as indicated above is one such as benzene (boiling point 80° C). In general, substances which can be employed to aid in the removal of water from the sphere of reaction between caustic potash and carbazole in my process are generally those which when boiled in the presence of water evolve a vapor containing some water, which have a boiling point below the reaction temperature, which do not carry over with them anthracene, carbazole or phenanthrene in any considerable quantity, and which do not damage or inactivate any of the materials involved in the reaction between caustic and carbazole or carbazole-bearing mixtures. In addition to benzene such substances include petroleum ether, gasoline, kerosene, toluene, xylene, solvent naphtha, naphthalene, etc. Of these it is preferable to use in the present process benzene, toluene, xylene and refined coal tar solvent naphthas having boiling ranges falling largely between 80 and 145° C. The latter solvents have other characteristics which render them particularly applicable, namely they have a specific gravity considerably below 1.00, they are non-polar, they do not tend to form sludges with any part of the carbazole-bearing mixtures, they have little tendency to form emulsions with water, they have low water solubility or are essentially immiscible in water, and they have comparatively great solvent powers for anthracene and carbazole.

By way of illustration the method hereinafter claimed is conducted as follows: Anthracene cake, for instance, is melted, solid particles of potassium hydroxide are mixed in the melt and the mix, preferably while stirring, is maintained at temperatures preferably between 230° C. and 235° C. until evolution of water caused by the reaction between the potassium hydroxide and carbazole has substantially ceased. The amount of potassium hydroxide may be slightly in excess of that required to react with all the carbazole in the melt. The particular proportions of potassium hydroxide and cake are not important.

For the purpose of carrying on the process an apparatus of the type shown in the accompanying diagrammatic drawing may be employed. The reaction is completed in an iron reaction chamber 1 provided with a stirrer 2, a heating jacket, and an outlet 3 for vapors, which outlet is preferably initially kept open and unconnected to other means. When water vapor no longer visibly issues from the outlet 3 a water trap is inserted. This trap comprises a vertical tube 4 having a valve 5 at its lower end, an arm 6 extending from the outlet 3 to an intermediate point in the tube 4, and a cooling jacket 7 for cooling a zone in the tube 4 above the arm 6. For observation purposes the tubes 4 and 6 may be constructed of glass, or some means may be provided to render visible the substances in the trap.

When the trap described above is connected to the reaction chamber, the benzene or any of the other above-mentioned solvents, is carefully introduced into the top of the tube 4 until the level of the solvent therein reaches the arm connection 6 and then there is added a slight amount of additional solvent to permit overflow thereof into the chamber 1. On reaching the chamber 1 the solvent causes an immediate and vigorous refluxing. As soon as the reflux is established water begins to collect in the trap. The refluxing of the benzene is continued until no more water is collected. It is found by chemical tests that at this point the percentage of carbazole remaining uncombined with the caustic is too small to be measured. In other words this is an indication that the reaction has proceeded to completion.

The contents of the reaction chamber 1 while hot are thereafter transferred into a solvent such as xylol. A complete solution is obtained of all the constituents with the exception of carbazolate. The carbazolate is then separated from the hot solvent solution by filtration and washed with a small amount of clean solvent. The separated carbazolate is then hydrolyzed with water to yield carbazole free of anthracene and the carbazole is separated from the hydrolyzing agent. The above filtrate separated from the carbazolate is allowed to cool to permit separation of crystals of anthracene which is obtained free from carbazole.

The following examples serve to illustrate in a more specific manner the use of my method:

*Example 1.*—About 5050 parts by weight of anthracene cake containing about 21% carbazole mixed with anthracene and the ordinarily associated compounds are melted, and solid potassium hydroxide of about 95% purity is slowly added in solid form to the molten cake up to the extent of about 456 parts by weight, which provides an excess of about 15% of potassium hydroxide above that theoretically or stoichiometrically required to transform all of the carbazole into carbazolate. The temperature of the reaction mass is maintained at about 230° C. while vigorously agitating it. The reaction is carried on in an apparatus of the type described above while adding solvent naphtha, benzene or the like in relatively minute amounts to the reaction mass preferably after the initial vigorous stage of the reaction. When the water formed in the reaction ceases to be evolved, the reaction mixture while hot is mixed with a solvent, such as xylene or solvent naphtha, in the ratio of about one part by weight of the reaction mixture to three parts by weight of the solvent. The insoluble carbazolate crystals are separated from the resulting mass by filtration. Anthracene which has been maintained in solution by the hot solvent, is separated by cooling to crystallize and by removing the substantially pure anthracene crystals by filtration or other means. The carbazolate crystals may be washed with additional solvent if necessary, and treated with a hydrolyzing agent as by heating in presence of water, whereupon carbazole is freed and separated from the hydrolyzing agent in which it is insoluble.

*Example 2.*—About 2000 parts by weight of a mixture containing about 51% anthracene and approximately 21% of carbazole, are heated to liquefy the same, and about 168 parts by weight of finely divided, solid potassium hydroxide are added over a period of about one hour while agitating and maintaining the temperature preferably in the approximate range of 230° C. to 235° C. to maintain the formed potassium carbazolate as solid crystals and to prevent excessive polymerization to pitchy material. The reaction mass is thereafter heated at this temperature for a period until water of reaction, which distills on dropping upon the reaction mass small proportions of refluxed liquid benzene or solvent naphtha or the like, no longer visibly accumulates in the trap of the above described apparatus. The total reaction period is up to about three hours with the proportions set forth in this example. Crystals of carbazolate are separated from the reaction mass and carbazole is recovered from these crystals in the manner indicated in Example 1. Anthracene is also recovered in substantially pure form in the manner set forth in Example 1.

The temperature at which carbazole can be reacted with potassium hydroxide in the above examples is above that at which the impure carbazole is liquefied by heat and up to a temperature at which the formation of excessive pitchy material (such as for instance takes place at 250 to 260° C. or even below) is avoided. Though the solvent is added to the reaction mass as reflux, it may be added by other means so long as the water evolved is removed from the system.

What is claimed is:

1. A process of separating anthracene from crude carbazole containing anthracene, which process comprises mixing and agitating said crude carbazole, in the absence of a solvent-diluent, with solid potassium hydroxide while heating at a temperature at which the crude carbazole is liquefied and not above about 235° C. to form potassium carbazolate, thereafter and while continuing the heating and agitation at said temperature dropping upon the reaction mass liquid hydrocarbon boiling in the range of substantially 80° to 145° C. in relatively minute amounts whereby the liquid hydrocarbon is vaporized upon contact with said mass and facilitates the vaporization of the water formed in the reaction, removing the vapors of said hydrocarbon and said water simultaneously with the dropping of said liquid hydrocarbon, continuing the dropping of the said liquid hydrocarbon on the said mass and the vaporization and removal of the said hydrocarbon and water while maintaining the resulting residual mass in an unvaporized state and until substantially all water is removed from the residual mass, to thereby permit substantially complete conversion of the carbazole in the crude carbazole to carbazolate in non-hydrolyzed form, and thereafter separating potassium carbazolate from the said residual mass by adding to said mass a solvent for anthracene and filtering the resulting solution from the undissolved carbazolate.

2. In a process of separating carbazole from anthracene cake in the "fusion" method, the improvement comprising: heating and agitating a fusion mixture of said anthracene cake and solid potassium hydroxide in the absence of a solvent-diluent at a temperature at which the cake is liquefied and not above about 235° C. to form potassium carbazolate, thereafter and while continuing the heating and agitation at said temperature dropping upon the fusion mixture liquid hydrocarbon boiling in the range of substantially 80° to 145° C. in relatively minute amounts whereby the liquid hydrocarbon is vaporized upon contact with said mass and facilitates the vaporization of the water formed in the reaction, removing the vapors of said hydrocarbon and said water simultaneously with the dropping of said liquid hydrocarbon, continuing the dropping of the said liquid hydrocarbon on the said mixture and the vaporization and removal of the said hydrocarbon and water while maintaining the resulting residual mixture in an unvaporized state and until substantially all water is removed from the latter mixture, to thereby permit substantially complete conversion of the carbazole in the cake to carbazolate in non-hydrolyzed form, and thereafter separating potassium carbazolate from the said residual mixture by adding to said mixture a solvent for the ingredients thereof which is a non-solvent for said potassium carbazolate and filtering the resulting solution from the undissolved carbazolate.

HUGH RODMAN, Jr.

REFERENCES CITED

The following references are of record in the file of this patent:

UNITED STATES PATENTS

| Number | Name | Date |
|---|---|---|
| 1,601,749 | Weil | Oct. 5, 1926 |
| 1,548,920 | Weil | Aug. 11, 1925 |
| 1,869,481 | Kahl | Aug. 2, 1932 |
| 1,404,055 | Portheim | Jan. 17, 1922 |

FOREIGN PATENTS

| Number | Country | Date |
|---|---|---|
| 139,981 | British | Mar. 18, 1920 |

OTHER REFERENCES

Shriner and Fuson, "Identification of Organic Compounds," John Wiley and Sons, Inc., New York, (1940), page 247.